(12) United States Patent
Oh et al.

(10) Patent No.: US 11,409,112 B2
(45) Date of Patent: Aug. 9, 2022

(54) ELECTRONIC DEVICE USING AN AUGMENTED REALITY

(71) Applicant: LG ELECTRONICS INC., Seoul (KR)

(72) Inventors: Taekyoung Oh, Seoul (KR); Seungyong Shin, Seoul (KR); Changkyu Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 298 days.

(21) Appl. No.: 16/490,477

(22) PCT Filed: Jul. 29, 2019

(86) PCT No.: PCT/KR2019/009427
§ 371 (c)(1),
(2) Date: Aug. 30, 2019

(87) PCT Pub. No.: WO2021/020607
PCT Pub. Date: Feb. 4, 2021

(65) Prior Publication Data
US 2021/0333561 A1      Oct. 28, 2021

(51) Int. Cl.
*G02B 27/01*        (2006.01)
*G02B 27/00*        (2006.01)
*G02C 11/00*        (2006.01)

(52) U.S. Cl.
CPC ..... *G02B 27/0176* (2013.01); *G02B 27/0093* (2013.01); *G02B 27/0172* (2013.01);
(Continued)

(58) Field of Classification Search
CPC  G02B 27/01; G02B 27/0101; G02B 27/0103; G02B 27/0149; G02B 27/017;
(Continued)

(56) References Cited

U.S. PATENT DOCUMENTS 6,448,944 B2 *   9/2002   Ronzani .............. G02B 27/017
                                                                 345/7
10,195,076 B2 *  2/2019   Fateh ..................... A61F 9/0026
(Continued)

FOREIGN PATENT DOCUMENTS

CN          105700148        6/2016
KR       1020020046890       6/2002
(Continued)

OTHER PUBLICATIONS

PCT International Application No. PCT/KR2019/009427, International Search Report dated Apr. 29, 2020, 3 pages.

*Primary Examiner* — Thomas K Pham
*Assistant Examiner* — Henry A Duong
(74) *Attorney, Agent, or Firm* — Lee Hong Degerman Kang & Waimey

(57) ABSTRACT

Provided is an electronic device using an augmented reality, which is capable of selectively driving a monocular mode and a binocular mode by using one display module. According to an aspect of the present invention, an electronic device includes: a glasses body including a left eye lens and a right eye lens and a nose support part positioned between the left and right lenses; one display module positioned at the nose support part; an optical system including a left eye optical system transferring a screen displayed on a display provided in the display module and to the left eye lens and a right eye optical system transferring the screen to the right eye lens; and a control unit controlling the screen displayed on the display so as to display the screen on at least one lens of the two lenses.

10 Claims, 10 Drawing Sheets

(52) U.S. Cl.
CPC ........ *G02C 11/10* (2013.01); *G02B 2027/014* (2013.01); *G02B 2027/0132* (2013.01); *G02B 2027/0154* (2013.01); *G02B 2027/0178* (2013.01)

(58) Field of Classification Search
CPC ............ G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02B 27/0093; G02C 11/10
USPC ......................................... 359/630
See application file for complete search history.

(56) References Cited

U.S. PATENT DOCUMENTS

| | | | |
|---|---|---|---|
| 11,039,124 B2* | 6/2021 | Tanaka | ................ H04N 13/344 |
| 2006/0245068 A1 | 11/2006 | Domjan et al. | |
| 2015/0168730 A1* | 6/2015 | Ashkenazi | ......... G02B 27/0172 |
| | | | 359/631 |
| 2019/0246889 A1* | 8/2019 | Marin | ................... A61B 3/028 |

FOREIGN PATENT DOCUMENTS

| | | |
|---|---|---|
| KR | 1020050072179 | 7/2005 |
| WO | 2018078409 | 5/2018 |

* cited by examiner (a)

(b)

(c)

(a)

(b)

(c)

RIGHT GAZING :
MONOCULAR (RIGHT)

FRONT GAZING :
BINOCULAR

LEFT GAZING :
MONOCULAR (LEFT)

ELECTRONIC DEVICE USING AN AUGMENTED REALITY

CROSS-REFERENCE TO RELATED APPLICATIONS

This application is the National Stage filing under 35 U.S.C. 371 of International Application No. PCT/KR2019/009427, filed on Jul. 29, 2019, the contents of which are hereby incorporated by reference herein in its entirety.

TECHNICAL FIELD

The present invention relates to an electronic device using an augmented reality, and more particularly, to an electronic device capable of selectively driving a monocular mode and a binocular mode using one display module.

BACKGROUND ART

An augmented reality (AR) is a technology that displays virtual objects overlapped with images and backgrounds of a reality. Unlike a virtual reality (VR) technology, in which objects, backgrounds, and environments are all made up of virtual images, the augmented reality technology mixes virtual objects in a real environment to provide additional information that a user feels more realistic in the real environment. For example, when the user goes along a road and shines around with a camera of a digital device, the user may be provided with building information and road information included in a screen collected by the camera. Such an augmented reality technology has recently attracted more attention as the supply of portable devices and wearable devices (for example, glasses, etc.) has spread.

The electronic device using the augmented reality in the related art, in particular, glasses are configured in any one structure of a monocular structure or a binocular structure.

Here, the monocular structure refers to a structure in which one display module is fixed to either a left side or a right side of the glasses to implement the augmented reality through either one of a left eye lens and a right eye lens and the binocular structure refers to a structure in which two display modules are fixed to the left and right sides of the glasses, respectively to implement the augmented reality through the left eye lens and the right eye lens.

Accordingly, glasses having the binocular structure has a problem in that a length of a printed circuit board (PCB) for driving the display module increases horizontally and the display module is added, and as a result, a weight of an electronic device increases and current consumption increases as compared with the glasses having the monocular structure.

In addition, the glasses having the monocular structure cannot operate in the binocular structure and the glasses having the binocular structure cannot operate in the monocular structure.

In addition, the glasses having the monocular structure should be designed as each of a left eye type and a right eye type for those with discomfort in one eye.

In addition, in the glasses in the related art, there is a problem in that a monocular/binocular cannot be changed by reflecting a requirement value of a user in a content viewing environment requiring a 3D effect or a screen (a use environment requiring multiple monitors, such as Powerpoint, Excel, drawings, etc.) having a wide field of view (FOV).

DISCLOSURE

Technical Problem

In order to solve such a problem and an embodiment of the present invention provides an electronic device using an augmented reality, which can be used selectively in any one mode of a monocular mode and a binocular mode by using one display module to reduce current consumption and reduce a weight, and to be used for a long time.

Another embodiment of the present invention provides an electronic device using an augmented reality, which is capable of reflecting a requirement value of a user in a screen having a wide field of view, etc., by increasing an aspect ratio when being driven in the monocular mode as compared with a case of being driven in the binocular mode.

Technical Solution

According to an aspect of the present invention, an electronic device using an augmented reality includes: a glasses body including a left eye lens and a right eye lens and a nose support part positioned between the left and right lenses; one display module positioned at the nose support part; an optical system including a left eye optical system transferring a screen displayed on a display provided in the display module and to the left eye lens and a right eye optical system transferring the screen to the right eye lens; and a control unit controlling the screen displayed on the display so as to display the screen on at least one lens of the two lenses.

The display may have an aspect ratio of m*n.

In this case, the control unit may simultaneously display on the display two screens divided at an aspect ratio of (m/2)*n in a binocular mode.

In addition, the control unit may display on the display only any one screen of two screens divided at the aspect ratio of (m/2)*n in a monocular mode.

According to the electronic device having such a configuration, since the binocular mode and the monocular mode may be selectively implemented only by one display module, a weight of the electronic device may be reduced, a size of the printed circuit board for controlling the display module may be reduced, and current consumption may be reduced as compared with the related art in which two display modules are disposed at both sides of the glasses in order to implement the binocular mode, thereby increasing a use time of a battery as compared with the related art.

According to another aspect of the present invention, the electronic device may further include a location adjustment unit adjusting relative locations of the display module and the optical system and the monocular mode and the binocular mode may be selected by using the location adjustment unit.

As an example, the control unit may simultaneously display on the display two screens divided at the aspect ratio of (m/2)*n in the binocular mode.

In this case, one screen of the two screens may be displayed on the left eye lens through the left eye optical system and the other one screen of the two screens may be displayed on the right eye lens through the right eye optical system.

In addition, the control units displays on the display one screen having the aspect ratio of m*n in the monocular mode.

In this case, due to the increased aspect ratio compared to the monocular mode in the related art, it is possible to utilize dual monitors when using a computer and the requirement value of the user may be reflected in a screen having a wide field of view (Powerpoint, Excel, drawing, etc.).

Centers of the nose support part, the display module and the optical system may coincide with each other in the binocular mode, and any one center selected from the center of the display module or the center of the optical system may be positioned to be shifted from the center of the nose support part in the monocular mode.

The location adjustment unit may include any one rail structure selected from a rail structure using a gear, the rail structure using a hydraulic system, or the rail structure using a solenoid.

The electronic device may further include a tracking sensor sensing movement of a pupil of a user and the control unit may control the screen displayed on the display according to a signal from the tracking sensor.

Advantageous Effects

According to the present invention, an electronic device can be used selectively in any one of a monocular mode and a binocular mode by using one display module.

Therefore, current consumption of the electronic device can be reduced, a weight can be reduced, and a use time of a battery can be increased.

In addition, in a case where the electronic device is driven in the monocular mode, an aspect ratio of a screen displayed on any one lens can be increased as compared with a case where the electronic device is driven in the binocular mode, so that a requirement value of a user can be reflected in a screen having a wide field of view, etc.

MODE FOR INVENTION

Figure 1:
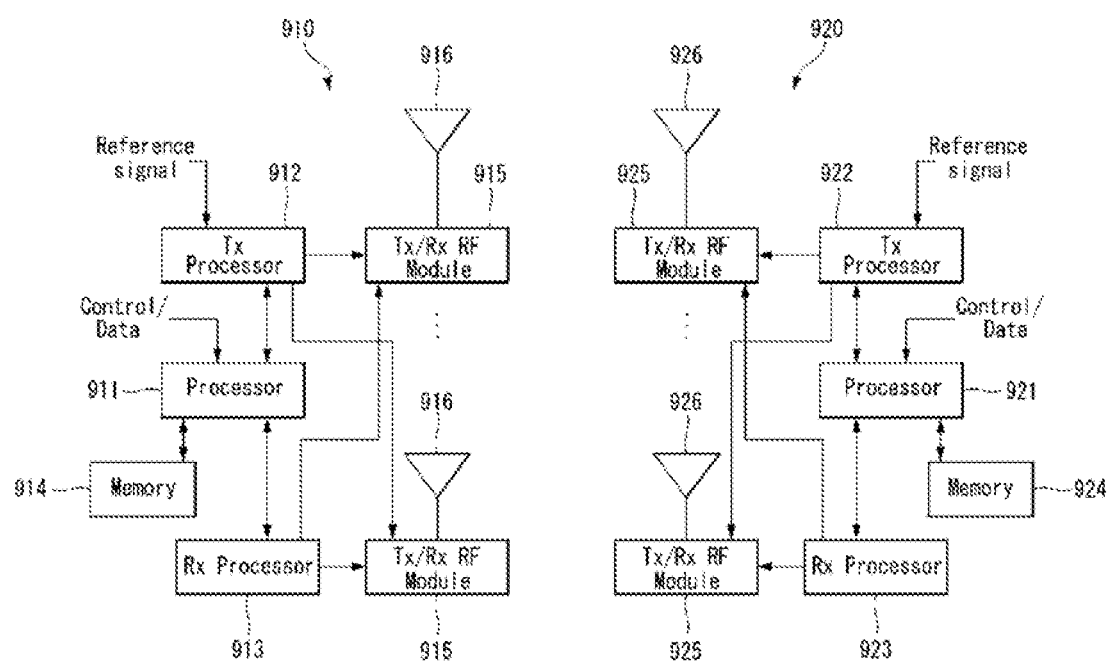
FIG. 1 illustrates a block diagram of a wireless communication device to which methods proposed by the present invention may be applied.

Hereinafter, exemplary embodiments of the present invention will be described in detail with reference to the attached drawings. Throughout the specification, like reference numerals denote substantially like components. In describing the present invention, a detailed description of known functions or configurations related to the present invention will be omitted when it is deemed that they may unnecessarily obscure the subject matter of the present invention. In describing various exemplary embodiments, descriptions of the same or like components will be given in the beginning but omitted in other exemplary embodiments.

Although terms including ordinal numbers such as "first" and "second" may be used to describe various components, the components are not limited by the terms. The terms are used only to distinguish one component from other components.

Hereinafter, 5G communication (5th generation mobile communication) required by an apparatus requiring AI processed information and/or an AI processor will be described through paragraphs A through D.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc.

For example, the HMD may be a display device worn on the head of a user. For example, the HMD may be used to realize VR, AR or MR.

For example, the drone may be a flying object that flies by wireless control signals without a person therein.

For example, the VR device may include a device that implements objects or backgrounds of a virtual world.

For example, the AR device may include a device that connects and implements objects or background of a virtual world to objects, backgrounds, or the like of a real world.

For example, the MR device may include a device that unites and implements objects or background of a virtual world to objects, backgrounds, or the like of a real world.

For example, the hologram device may include a device that implements 360-degree 3D images by recording and playing 3D information using the interference phenomenon of light that is generated by two lasers meeting each other which is called holography.

For example, the public safety device may include an image repeater or an imaging device that can be worn on the body of a user.

For example, the MTC device and the IoT device may be devices that do not require direct interference or operation by a person.

For example, the MTC device and the IoT device may include a smart meter, a bending machine, a thermometer, a smart bulb, a door lock, various sensors, or the like.

For example, the medical device may be a device that is used to diagnose, treat, attenuate, remove, or prevent diseases.

For example, the security device may be a device that is installed to prevent a danger that is likely to occur and to keep safety. For example, the security device may be a camera, a CCTV, a recorder, a black box, or the like.

For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926.

The Tx/Rx module is also referred to as a transceiver. Each Tx/Rx module 915 transmits a signal through each antenna 926.

The processor implements the aforementioned functions, processes and/or methods. The processor 921 may be related to the memory 924 that stores program code and data. The memory may be referred to as a computer-readable medium.

More specifically, the Tx processor 912 implements various signal processing functions with respect to L1 (i.e., physical layer) in DL (communication from the first communication device to the second communication device).

The Rx processor implements various signal processing functions of L1 (i.e., physical layer).

UL (communication from the second communication device to the first communication device) is processed in the first communication device 910 in a way similar to that described in association with a receiver function in the second communication device 920.

Each Tx/Rx module 925 receives a signal through each antenna 926. Each Tx/Rx module provides RF carriers and information to the Rx processor 923.

The processor 921 may be related to the memory 924 that stores program code and data. The memory may be referred to as a computer-readable medium.

According to an embodiment of the present invention, the first communication device may be glasses, and the second communication device may be a 5G network.

B. Signal Transmission/Reception Method in Wireless Communication System

Figure 2:
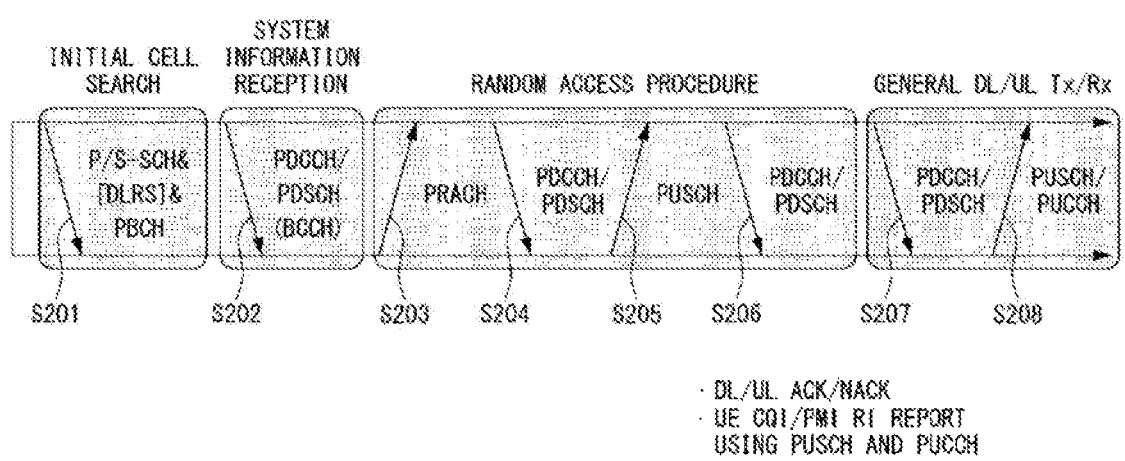
FIG. 2 is a diagram illustrating an example of a method for transmitting/receiving a signal in a wireless communication system.

FIG. 2 is a diagram showing an example of a signal transmission/reception method in a wireless communication system.

In a wireless communication system, a terminal receives information through a downlink (DL) from a base station, and the terminal transmits information through an uplink (UL) to the base station. The information transmitted and received between the base station and the terminal includes data and various control information, and various physical channels exist according to the type/use of the information transmitted and received.

When the terminal is powered on or enters a new cell, the terminal performs an initial cell search operation such as synchronizing with the base station (S201). For this operation, the terminal may receive a Primary Synchronization Signal (PSS) and a Secondary Synchronization Signal (SSS) from the base station to synchronize with the base station and obtain information such as a cell ID. Thereafter, the terminal may receive a physical broadcast channel (PBCH) from the base station to obtain broadcast information in a cell. Meanwhile, the terminal may check a downlink channel state by receiving a downlink reference signal (DL RS) in an initial cell search step.

After initial cell search, the terminal can acquire more detailed system information by receiving a physical downlink shared channel (PDSCH) according to a physical downlink control channel (PDCCH) and information included in the PDCCH (S202).

Meanwhile, when the terminal initially accesses the BS or has no radio resource for signal transmission, the terminal can perform a random access procedure (RACH) for the BS (steps S203 to S206). To this end, the terminal can transmit a specific sequence as a preamble through a physical random access channel (PRACH) (S203 and S205) and receive a random access response (RAR) message for the preamble through a PDCCH and a corresponding PDSCH. In the case of a contention-based RACH, a contention resolution procedure may be additionally performed (S206).

After the terminal performs the above-described process, the terminal can perform PDCCH/PDSCH reception (S207) and physical uplink shared channel (PUSCH)/physical uplink control channel (PUCCH) transmission (S208) as normal uplink/downlink signal transmission processes. Particularly, the terminal receives downlink control information (DCI) through the PDCCH. Here, the DCI includes control information such as resource allocation information for the terminal, and the format may be applied differently according to the purpose of use.

Meanwhile, the control information transmitted by the terminal to the base station through the uplink or received by the terminal from the base station is a downlink/uplink ACK/NACK signal, Channel Quality Indicator (CQI), Precoding Matrix Index (PMI), Rank Indicator (RI) and the like. The UE may transmit the above-described control information such as CQI/PMI/RI through PUSCH and/or PUCCH.

C. AI Basic Operation Using 5G Communication

Figure 3:
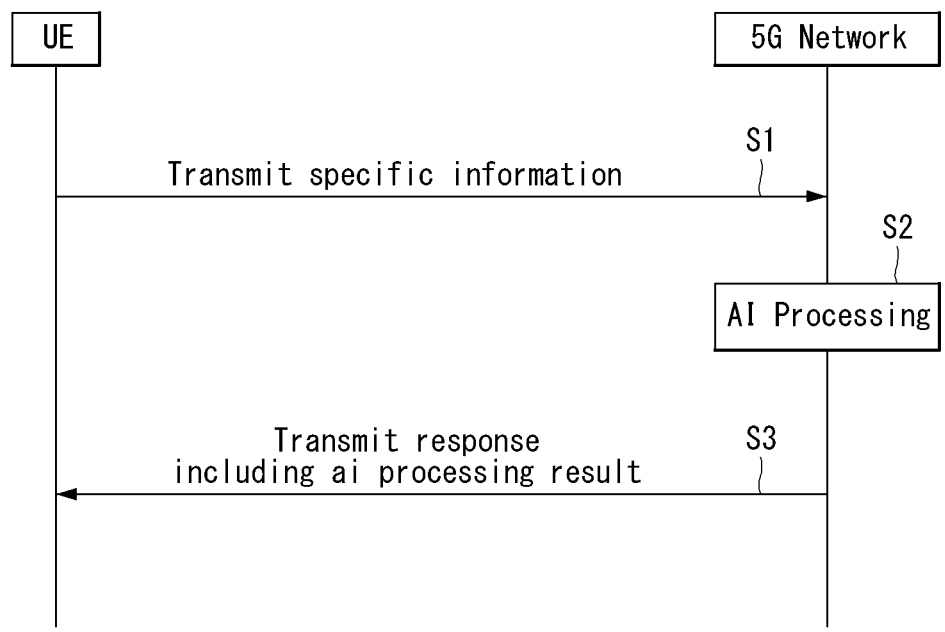
FIG. 3 is a diagram illustrating an example of basic operations of a user terminal and a 5G network in a 5G communication system.

FIG. 3 shows an example of basic operations of a terminal and a 5G network in a 5G communication system.

The UE transmits specific information transmission to the 5G network (S1). The 5G network performs 5G processing on the specific information (S2). Here, 5G processing may include AI processing. The 5G network transmits a response including the AI processing result to the UE (S3).

D. Applied Operations Between a Terminal and 5G Network in 5G Communication System Hereinafter, the AI operation using 5G communication will be described in more detail with reference to wireless communication technology (BM procedure, URLLC, mMTC, etc.) described in FIGS. 1 and 2.

As in steps S1 and S3 of FIG. 3, the UE performs an initial access procedure and a random access procedure with the 5G network prior to step S1 of FIG. 3 in order to transmit/receive signals, information and the like to/from the 5G network.

More specifically, the UE performs an initial access procedure with the 5G network on the basis of an SSB in order to acquire DL synchronization and system information.

A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission.

The 5G network can transmit, to the UE, a UL grant for scheduling transmission of specific information. Accordingly, the UE transmits the specific information to the 5G network on the basis of the UL grant.

In addition, the 5G network transmits, to the UE, a DL grant for scheduling transmission of 5G processing results with respect to the specific information. Accordingly, the 5G network may transmit a response including the AI processing result to the UE based on the DL grant.

As described above, the UE can receive DownlinkPreemption IE from the 5G network after the UE performs an initial access procedure and/or a random access procedure with the 5G network.

Then, the UE receives DCI format 2_1 including a preemption indication from the 5G network on the basis of DownlinkPreemption IE.

The UE does not perform (or expect or assume) reception of eMBB data in resources (PRBs and/or OFDM symbols) indicated by the preemption indication.

Thereafter, when the UE needs to transmit specific information, the UE can receive a UL grant from the 5G network.

In step S1 of FIG. 3, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions.

That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource.

The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Electronic Device Using Augmented Reality

Figure 4:
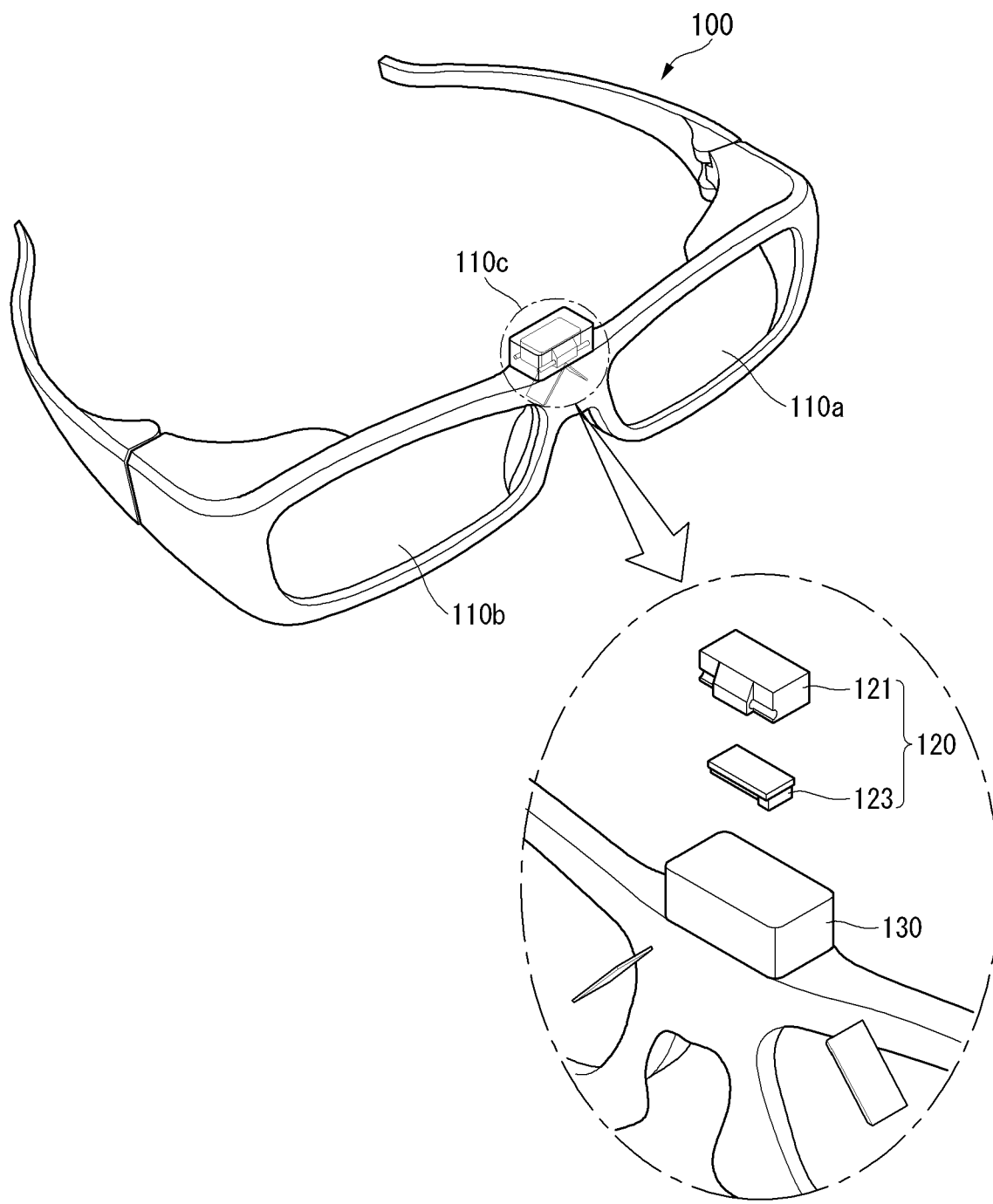
FIG. 4 is a perspective view illustrating a configuration of an electronic device according to a first embodiment of the present invention.
Figure 5:
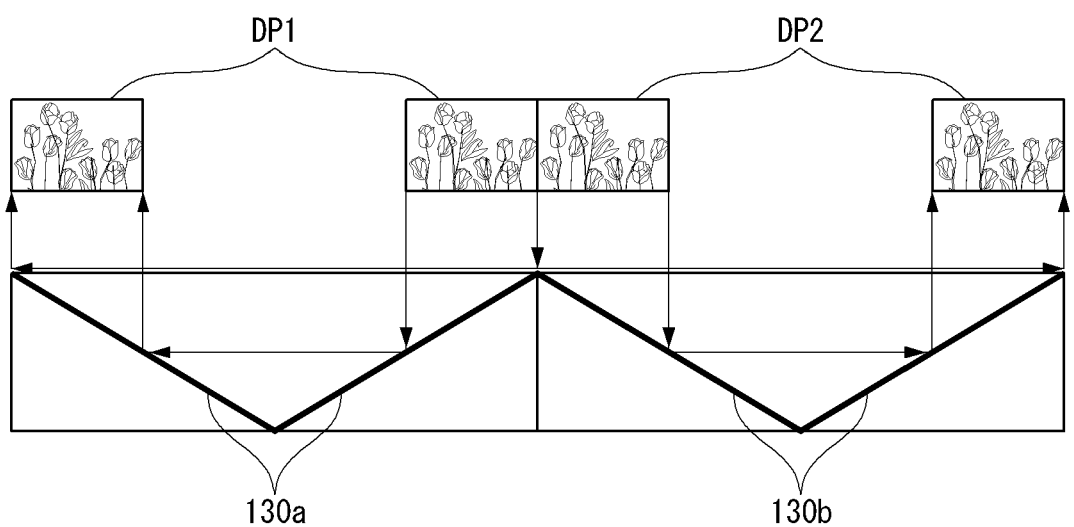
FIG. 5 is a conceptual view when the electronic device illustrated in FIG. 4 operates in a binocular mode.
Figure 6:
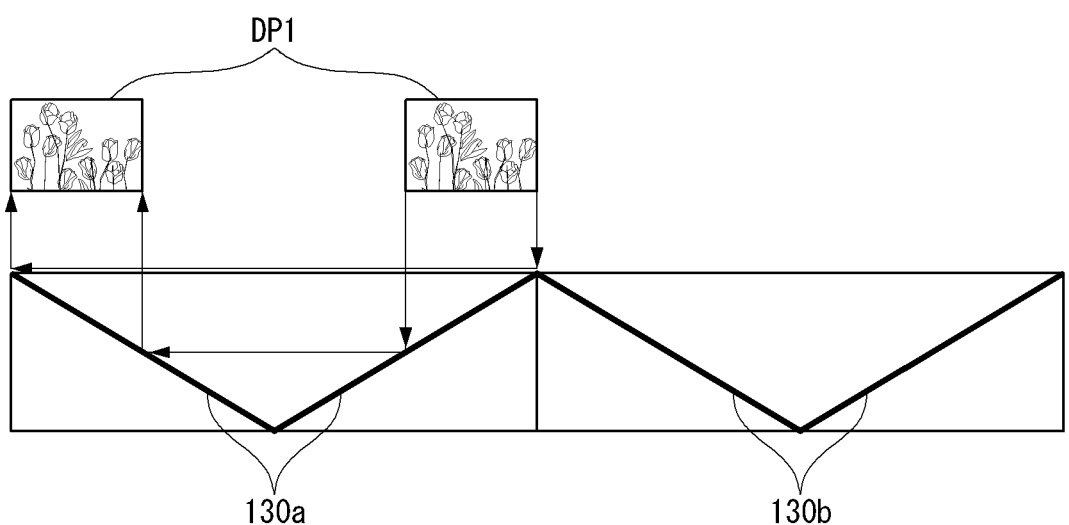
FIG. 6 is a conceptual view when the electronic device illustrated in FIG. 4 operates in a monocular mode.

FIG. 4 is a perspective view illustrating a configuration of an electronic device according to a first embodiment of the present invention. FIG. 5 is a conceptual view when the electronic device illustrated in FIG. 4 operates in a binocular mode. FIG. 6 is a conceptual view when the electronic device illustrated in FIG. 4 operates in a monocular mode.

Referring to FIG. 4, a glass type electronic device using the augmented reality includes a glasses body 100.

The glasses body 100 includes a left eye lens 110a, a right eye lens 110b, and a nose support part 110c positioned between the lenses 110a and 110b. Accordingly, the glasses body 100 may be worn on a head part of a human body.

Unlike an electronic device in the related art, in the electronic device of the present invention, one display module 120 is installed in the nose support part 110c. The display module 120 may include a housing 121 and a module unit 123 and the module unit 123 includes one display having an aspect ratio of m*n.

The display module 120 may be configured by a micro display such as micro OLED, DLP, micro LED, LCOS, etc.

In addition, below the display module 120, an optical system 130 is installed, which includes a left eye optical system 130a transferring a screen displayed on a display of the display module 120 to the left eye lens 110a and a right eye optical system 130b transferring the screen to the right eye lens 110b.

The optical system 130 may be configured by a geometric reflection type optical system such as a combiner, a pin mirror, etc., or configured by a diffraction type optical system such as a hologram optical element (HOE) a diffractive optical element (DOE), etc.

In addition, the electronic device of the present invention includes a control unit controlling the screen displayed on the display in order to display the screen on at least one lens 110a and/or 110b of two lenses 110a and 110b.

The control unit is configured to control various electronic components provided in the electronic device. In the figure, an installation location of the control unit is not specified, but the control unit may be provided in a printed circuit board provided in the display module and the location of the control unit is not limited thereto.

In the electronic device having such a configuration, since one display module 120 is installed at the nose support part 110c, the binocular mode and the monocular mode may be selectively implemented.

In this regard, the control unit may simultaneously display two screens DP1 and DP2 divided at an aspect ratio of (m/2)*n on the display in the binocular mode.

Therefore, one screen DP1 positioned on a left side of two screens DP1 and DP2 displayed on the display is transferred to the left eye lens through the left eye optical system 130a and one screen DP2 positioned on a right side is transferred to the right eye lens through the right eye optical system 130b.

In addition, the control unit may display only one screen DP1 of two screens divided at the aspect ratio of (m/2)*n on the display in the monocular mode.

In this case, one screen DP1 displayed on the display is transferred to the left eye lens through the left eye optical system 130a.

Unlike this, when the control unit displays on the display only any one screen DP2 of two screens divided at the aspect ratio of (m/2)*n, one screen DP2 displayed on the display may be transferred to the right eye lens through the right eye optical system 130b.

According to the electronic device having such a configuration, since the binocular mode and the monocular mode may be selectively implemented only by one display module, a weight of the electronic device may be reduced, a size of the printed circuit board for controlling the display module may be reduced, and current consumption may be reduced as compared with the related art in which two display modules are disposed at both sides of the glasses in order to implement the binocular mode, thereby increasing a use time of a battery as compared with the related art.

Hereinafter, an electrode device according to a second embodiment of the present invention will be described with reference to FIGS. 7 to 9.

Figure 7:
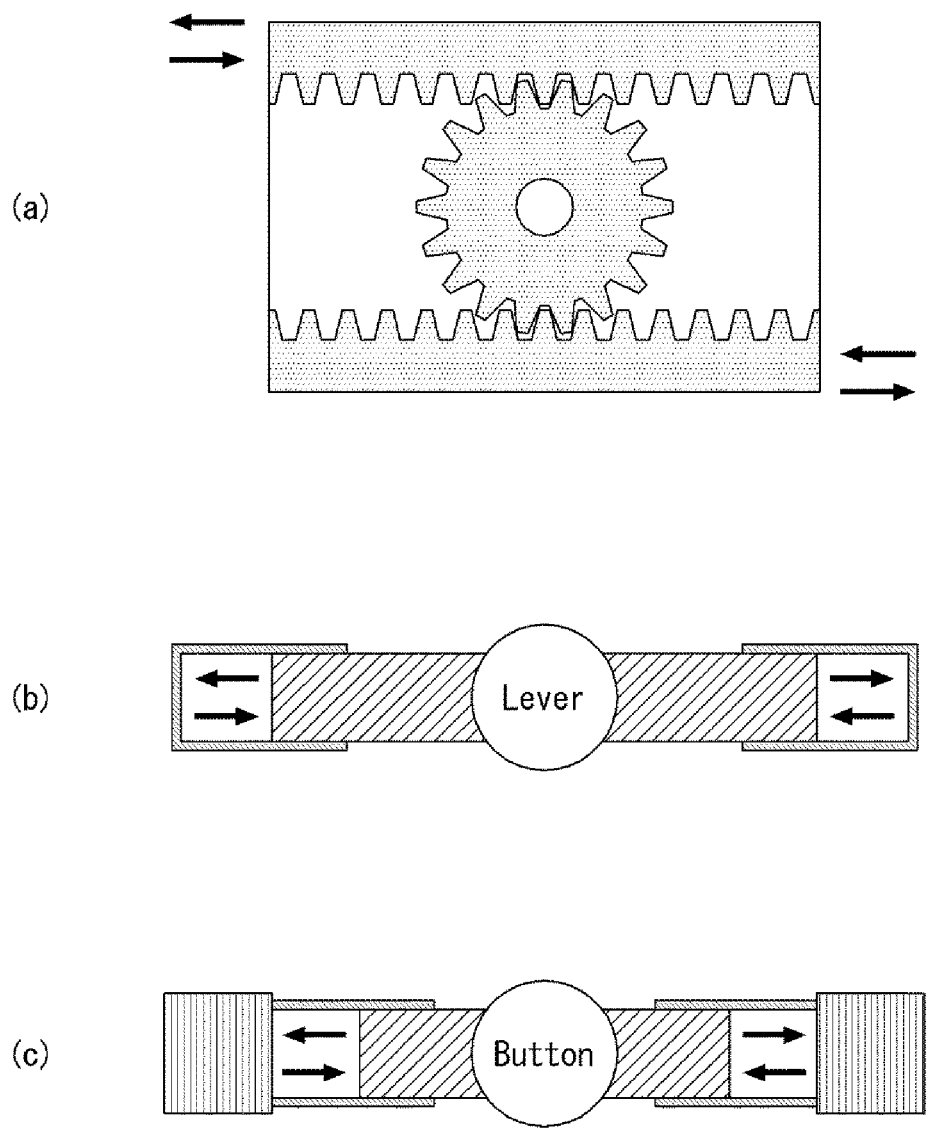
FIG. 7 is a diagram illustrating a schematic configuration of a location adjustment unit provided in an electronic device according to a second embodiment of the present invention.

FIG. 7 is a diagram illustrating a schematic configuration of a location adjustment unit provided in an electronic device according to a second embodiment of the present invention. FIG. 8 is a conceptual view when the electronic device operates in a left eye mode according to the second embodiment of the present invention. FIG. 9 is a conceptual view when the electronic device operates in a right eye mode according to the second embodiment of the present invention.

Since a basic configuration of the electronic device of the embodiment is the same as that illustrated in FIG. 4, a description thereof will be omitted.

The electronic device of the embodiment may further include a location adjustment unit selecting the monocular mode and the binocular mode by adjusting relative locations of the display module 120 and the optical system 130 illustrated in FIG. 4.

The location adjustment unit may include a rail structure using a gear as illustrated in FIG. 7(a), include the rail structure using a hydraulic system as illustrated in FIG. 7(b), or include the rail structure using a solenoid as illustrated in FIG. 7(c).

Although not illustrated, the location adjustment unit may include various structures capable of adjusting the relative locations of the display module 120 and the optical system 130 in addition to the rail structure mentioned above.

According to the electronic device having such a configuration, the control unit may simultaneously display two screens DP1 and DP2 divided at the aspect ratio of (m/2)*n on the display in the binocular mode as illustrated in FIG. 5.

In this case, one screen DP1 of two screens DP1 and DP2 may be displayed on the left eye lens 110a through the left eye optical system 130a and the other one screen DP2 of two screens DP1 and DP2 may be displayed on the right eye lens 110b through the right eye optical system 130b.

In the binocular mode, centers of the nose support part 110c, and the display module 120 and the optical system 130 may coincide with each other.

As described above, in the binocular mode, the screen displayed on the display by the control unit of the electronic device of the first embodiment is the same as the screen displayed on the display by the control unit of the electronic device of the second embodiment.

That is, in the electronic device of the first embodiment and the electronic device of the second embodiment, in the binocular mode, two screens DP1 and DP2 having the aspect ratio of (m/2)*n are simultaneously displayed on the display.

However, unlike the electronic device of the first embodiment, since the relative locations of the display module 120 and the optical system 130 are changed in the electronic device of the embodiment, in the monocular mode, the control unit displays on the display one screen DP1' or DP2' having an aspect ratio of m*n.

Figure 8:
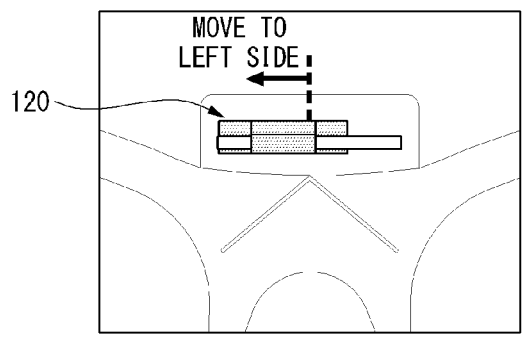
FIG. 8 is a conceptual view when the electronic device operates in a left eye mode according to the second embodiment of the present invention.
Figure 8:
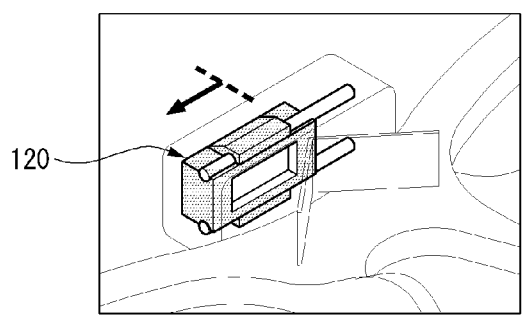
Figure 8:
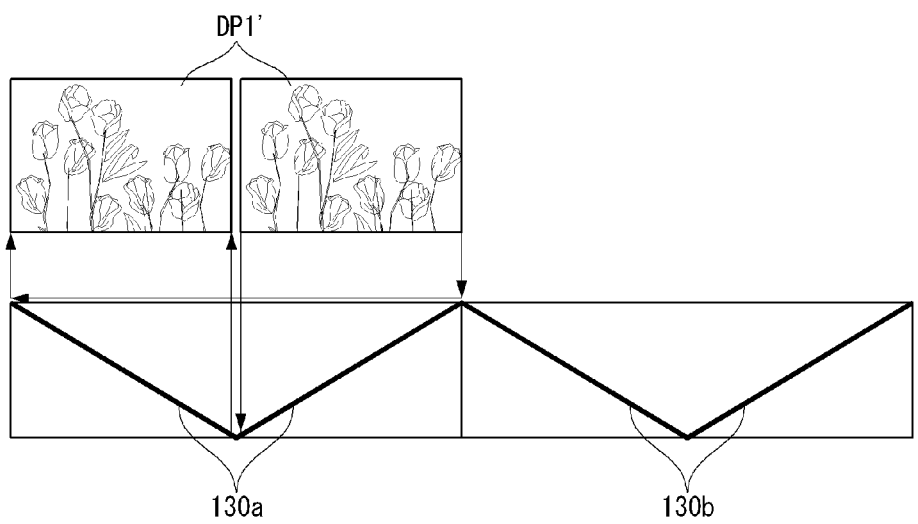

As an example, as illustrated in FIG. 8, when the user moves the display module 120 to the left side, the control unit recognizes a left monocular mode and displays the screen DP1' having the aspect ratio of m*n on the display of the display module 120.

Figure 9:
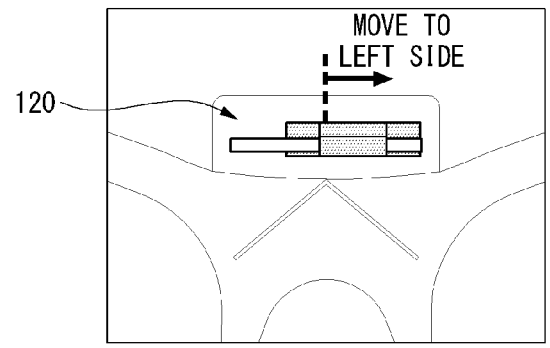
FIG. 9 is a conceptual view when the electronic device operates in a right eye mode according to the second embodiment of the present invention.
Figure 9:
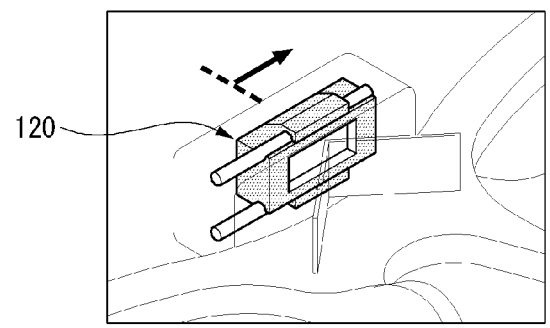
Figure 9:
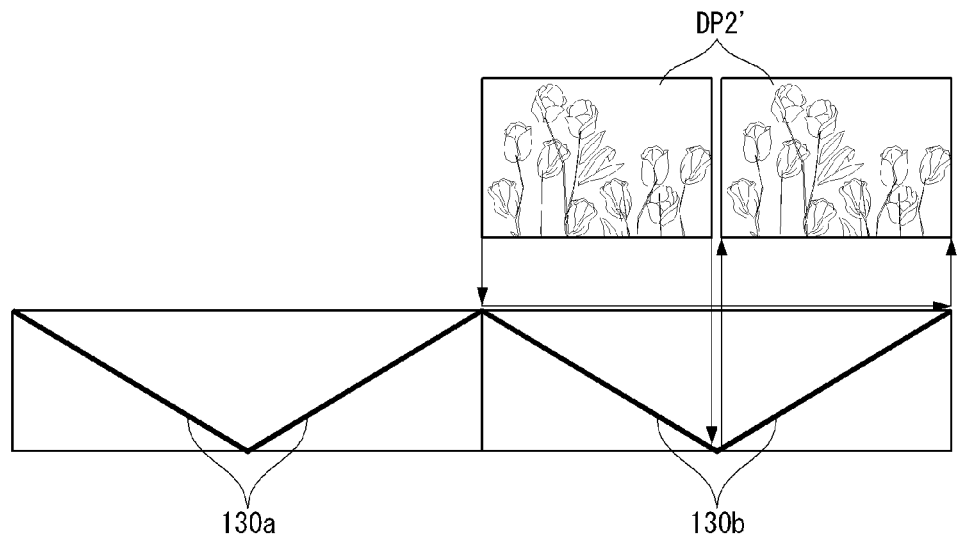

Unlike this, as illustrated in FIG. 9, when the user moves the display module 120 to the right side, the control unit recognizes a right monocular mode and displays the screen DP2' having the aspect ratio of m*n on the display of the display module 120.

In the above description, it is described that the location of the display module is moved, it is possible to move the location of the optical system instead of the display module.

Therefore, according to the electronic device of the embodiment, due to the increased aspect ratio compared to the monocular mode illustrated in FIG. 6, it is possible to utilize dual monitors when using a computer and the requirement value of the user may be reflected in a screen having a wide field of view (Powerpoint, Excel, drawing, etc.).

On the other hand, according to an electronic device according to another embodiment of the present invention, the electronic device may further include a tracking sensor sensing movement of a pupil of the user.

Figure 10:
FIG. 10 is a diagram illustrating a situation of operating in a binocular mode or a monocular mode according to a signal from a tracking sensor provided in an electronic device according to a third embodiment of the present invention.
Figure 10:
Figure 10:

In this case, as illustrated in FIG. 10, when it is sensed by the tracking sensor that the pupil of the user gazes at the right side, the control unit may drive the electronic device in the right eye monocular mode according to a signal from the tracking sensor.

Similarly, when the tracking sensor senses that the pupil of the user gazes at the left side, the control unit may drive the electronic device in the left eye monocular mode according to the signal from the tracking sensor and when the tracking sensor senses that the pupil of the user gazes at a front, the control unit may drive the electronic device in the binocular mode according to the signal from the tracking sensor.

In addition, the electronic device of the present invention may further include a photographing means photographing a front image, an input unit manipulated to receive a control command, a microphone receiving a sound and processing the sound as electrical voice data, a sound output unit outputting the sound, a wireless communication unit, an interface unit, a memory, and a power supply unit and may include more or less components than those listed above.

Among the components, the wireless communication unit may include one or more modules that enable wireless communication between the electronic device and the wireless communication system, between the electronic device and another electronic device, or between the electronic device and an external server. In addition, the wireless communication unit may include one or more modules that connect the electronic device to one or more networks.

The wireless communication unit may include at least one of a broadcast receiving module, a mobile communication module, a wireless Internet module, a short-range communication module, and a location information module.

In addition, the input unit may include a camera or a video input unit for inputting a video signal, a microphone or an audio input unit for inputting an audio signal, a user input unit for receiving information from the user, e.g., a touch key and a push key and voice data collected by the input unit or image data is analyzed to be processed by the control command of the user.

In addition, the interface unit serves as a path to various types of external devices connected to the electronic device. The interface unit may include at least one of a wireless/wired headset port, an external charger port, a wired/wireless data port, a memory card port, a port connecting a device with an identification module, an audio input/output (I/O) port, a video input/output (I/O) port, and an earphone port. The electronic device using the augmented reality may perform appropriate control related to the connected external device in response to connection of the external device to the interface unit.

In addition, the memory may store data for supporting various functions of the electronic device. The memory may store multiple application programs (or applications) driven by the electronic device, data for operating the electronic device, commands, and the like.

At least some of the applications may be downloaded from the external server via wireless communication. Further, at least some of the application programs may exist on the electronic device from a time of releasing the electronic device for a basic function (e.g., call receiving and sending functions and message receiving and sending functions).

Meanwhile, the application program is stored in the memory and installed in the electronic device to be driven to perform an operation (or function) of the electronic device by the control unit.

The power supply unit may receive external power and internal power and supply power to each component included in the electronic device under control of the control unit. The power supply unit may include the battery and the battery may become a built-in battery or a replaceable battery.

At least some of the respective components may operate in cooperation with each other in order to implement the operation, the control, or a control method of the electronic device according to various embodiments described above.

Further, the operation, the control, or a control method of the electronic device may be implemented on a mobile terminal by driving at least one application program stored in the memory.

It will be apparent to those skilled in the art that various changes and modifications can be made without departing from the technical spirit of the present invention through contents described above. Therefore, the technical scope of the present invention should not be limited to the contents described in the detailed description of the specification but should be defined by the claims.

What is claimed is:

1. An electronic device using an augmented reality, comprising:
    a glasses frame including a left eye lens, a right eye lens, and a nose support part positioned between the left and right eye lenses;
    a display module positioned at the nose support part;
    an optical system including a left eye optical system configured to transfer a screen displayed on a display of the display module to the left eye lens and a right eye optical system configured to transfer the screen to the right eye lens;
    a location adjustment unit configured to select a monocular mode for displaying the screen on either one of the left eye lens and the right eye lens and a binocular mode for displaying the screen on both the left eye lens and the right eye lens by adjusting relative locations of the display module and the optical system; and
    a control unit configured to cause the display to display the screen on at least one lens of the left or right eye lenses.

2. The electronic device of claim 1, wherein the display has a size of m*n in width and length.

3. The electronic device of claim 2, wherein the control unit is further configured to cause the display to simultaneously display two screens divided at a size of (m/2)*n in a binocular mode.

4. The electronic device of claim 2, wherein the control unit is further configured to cause the display to display only one screen of two screens divided at a size of (m/2)*n in a monocular mode.

5. The electronic device of claim 2, wherein the control unit is further configured to cause the display to simultaneously display two screens divided at a size of (m/2)*n in the binocular mode.

6. The electronic device of claim 5, wherein one screen of the two screens is displayed on the left eye lens through the left eye optical system and the other one screen of the two screens is displayed on the right eye lens through the right eye optical system.

7. The electronic device of claim 2, wherein the control unit is further configured to cause the display to display one screen having the size of m*n in the monocular mode.

8. The electronic device of claim 2, wherein in the binocular mode, centers of the nose support part, the display module and the optical system coincide with each other, and
    wherein in the monocular mode, any one center selected from the center of the display module or the center of the optical system is positioned to be shifted from the center of the nose support part.

9. The electronic device of claim 2, wherein the location adjustment unit includes any one rail structure selected from a rail structure using a gear, the rail structure using a hydraulic system, or the rail structure using a solenoid.

10. The electronic device of claim 1, further comprising:
    a tracking sensor configured to sense movement of a pupil of a user,
    wherein the control unit is further configured to control the screen displayed on the display according to a signal from the tracking sensor.

* * * * *